United States Patent [19]

Kunz

[11] Patent Number: 4,835,073
[45] Date of Patent: May 30, 1989

[54] MOLTEN CARBONATE ELECTROLYTE CREEPAGE BARRIER

[75] Inventor: H. Russell Kunz, Vernun, Conn.

[73] Assignee: Gas Research Institute, Chicago, Ill.

[21] Appl. No.: 61,537

[22] Filed: Jun. 11, 1987

Related U.S. Application Data

[62] Division of Ser. No. 721,226, Apr. 8, 1985, Pat. No. 4,704,340.

[51] Int. Cl.⁴ ............................................. H01M 8/04
[52] U.S. Cl. ....................................... 429/16; 429/18; 429/35
[58] Field of Search ...................... 429/16, 18, 29, 35, 429/12

[56] References Cited

U.S. PATENT DOCUMENTS 4,548,874  10/1985  Katz et al. ........................ 429/35 X Primary Examiner—Anthony Skapars
Attorney, Agent, or Firm—Trexler, Bushnell, Giangiorgi & Blackstone

[57] ABSTRACT

A fuel cell electrical power generation apparatus comprises a fuel cell including a cathode and an anode and an electrolyte matrix containing a quantity of a molten carbonate electrolyte between the cathode and anode; and an electrolyte creepage barrier for substantially preventing electrolyte creepage at the anode of the fuel cell. The electrolyte creepage barrier comprises a relatively thin layer of a material which is poorly wet by the electrolyte disposed in such a way as to substantially prevent electrolyte creepage at the anode of the fuel cell. A related method for blocking creepage of molten carbonate electrolyte in a fuel cell comprises disposing a creepage barrier in such a way as to substantially prevent electrolyte creepage at the anode of the fuel cell.

9 Claims, 2 Drawing Sheets

MOLTEN CARBONATE ELECTROLYTE CREEPAGE BARRIER

This is a divisional of application Ser. No. 721,226 filed on Apr. 8, 1985, now U.S. Pat. No. 4,704,340.

BACKGROUND OF THE INVENTION

The invention is directed generally to the fuel cell arts and more particularly concerns molten carbonate electrolyte fuel cells, and still more particularly concerns a novel creepage barrier for a molten carbonate electrolyte fuel cell.

A fuel cell is an energy conversion device which continuously and directly converts chemical energy of a fuel into electrical energy by an electrochemical process. Generally speaking, a fuel cell is analogous to a familiar dry cell battery, in that it comprises a pair of electrodes placed in contact with a liquid or solid electrolyte However, unlike the dry cell battery, the fuel cell uses fuel such as hydrogen which is introduced at one electrode. An oxidant such as oxygen from the surrounding air enters at the other electrode. The fuel is oxidized in an electrochemical reaction which takes place at the interface between the electrodes and the electrolyte. The oxidation of the fuel releases a flow of electrons between the anode and the cathode. Hence, the anode and cathode may be coupled to an external electrical circuit to produce a flow of electrical current therethrough. Unlike the dry cell battery, a fuel cell does not, at least in theory, run down or require recharging; rather, it will operate as long as the fuel and oxidant continue to be supplied to the electrodes.

A molten carbonate fuel cell is one which utilizes a molten carbonate substance as the electrolyte. Such a molten carbonate electrolyte is solid at room temperature and becomes a molten liquid at operating temperatures which may range between 500 degrees C. and 750 degrees C. Such fuel cells are shown for example in U.S. Pat. Nos. 4,009,321 and 4,079,171. Such molten carbonate electrolytes may comprise alkali metal carbonate compositions, such as lithium, sodium or potassium carbonates. This electrolyte is preferably provided in the form of a substantially inert matrix sandwiched between an anode electrode and a cathode electrode. One such matrix is shown and described in U.S. Pat. No. 4,411,968, which also sets forth additional suitable electrolyte materials.

A single fuel cell of the type described produces a relatively low voltage of on the order of 1.0 volts DC. However, such fuel cells advantageously exhibit a relatively high current density capability. Hence, the power density (Watts per unit area) which may be generated by such fuel cells is relatively high. Accordingly, higher voltages are obtained by placing individual fuel cells in a series configuration in what is generally termed a "fuel cell stack". In such a configuration, the individual cells are quite literally stacked one on top of another to obtain a desired voltage from the series circuit configuration thus obtained.

One significant problem which has arisen with respect to such fuel cell stacks is the loss of electrolyte material therefrom. This electrolyte loss is believed to result from a number of effects, a significant one of which is termed electrolyte creepage. By creepage is meant the tendency of the electrolyte to creep or flow in films along the surfaces of the fuel cell stack and toward the negative or anode end thereof. A continuous loss of electrolyte in this fashion results in gradual corresponding withdrawal of electrolyte from the pores of the matrix. This in turn is believed to result in a formulation of gas pockets in the matrix which cause the internal resistance of the fuel cells to rise, thereby causing a decline in the voltage produced across the fuel cell. As the loss of electrolyte becomes progressively greater, the cell resistance thus dramatically increases, causing a rapid and non-recoverable drop in the cell voltage.

OBJECTS AND SUMMARY OF THE INVENTION

Accordingly, it is a general object of the invention to provide a novel and improved fuel cell including novel structure for blocking the creepage of molten carbonate electrolyte at the negative end of the fuel cell.

A related object is to provide a method for blocking creepage of molten carbonate electrolyte in a fuel cell stack.

A more specific object is to provide a creepage barrier for substantially blocking the creepage of molten carbonate electrolyte at the negative end of the fuel cell stack.

Briefly, and in accordance with the foregoing objects, a fuel cell electrical power generation apparatus in accordance with one aspect of the invention comprises fuel cell means including an anode and a cathode and an electrolyte matrix containing a quantity of a molten carbonate electrolyte between the anode and cathode; and creepage barrier means for substantially preventing electrolyte creepage at the anode of said fuel cell.

In accordance with another aspect of the invention, there is provided an electrolyte creepage barrier for a molten carbonate fuel cell comprising a relatively thin layer of a material which is poorly wet by said electrolyte disposed in such a way as to substantially prevent electrolyte creepage at a negative end of the fuel cell.

In accordance with yet another aspect of the invention, there is provided a method for blocking creepage of molten carbonate electrolyte in a fuel cell stack comprising disposing a creepage barrier in such a way as to substantially prevent electrolyte creepage at a negative end of said fuel cell stack

BRIEF DESCRIPTION OF THE DRAWINGS

The features of the present invention which are believed to be novel are set forth with particularity in the appended claims. The organization and manner of operation of the invention, together with further features and advantages thereof may best be understood by reference to the following description taken in connection with the accompanying drawings in the several figures of which like reference numerals identify like elements and in which:

DETAILED DESCRIPTION OF THE ILLUSTRATED EMBODIMENT

Figure 1:
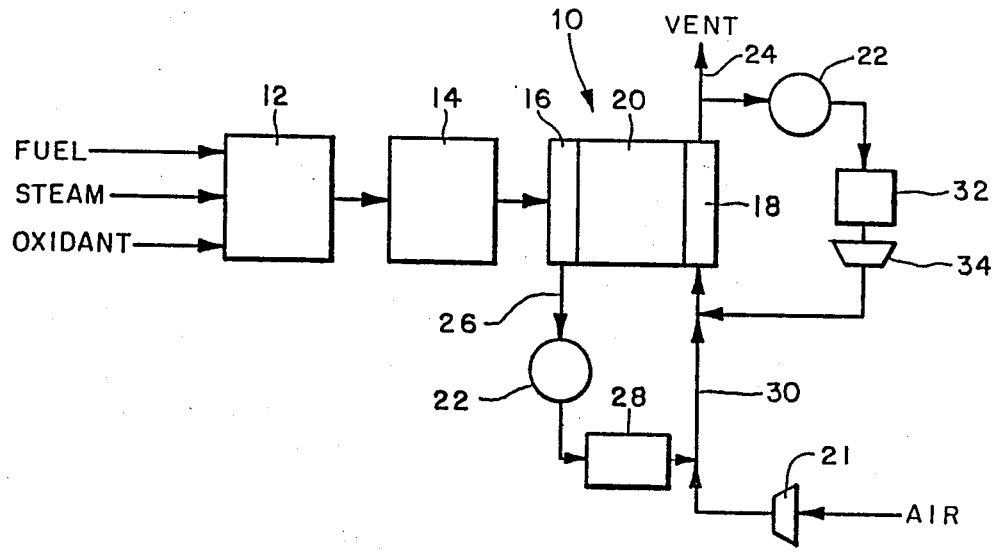
FIG. 1 is a block diagrammatic representation of the components of a fuel cell electrical power generation system.

Referring now to the drawings, and initially to FIG. 1, a fuel cell electrical power generation system is shown in diagrammatic form. A power section 10 comprises a fuel cell stack, comprising a desired number of individual fuel cells stacked in series configuration to obtain a desired voltage thereacross. In the illustrated system, the fuel cell stack comprises molten carbonate electrolyte fuel cells. Such fuel cells can operate on various fuels ranging from naphtha and high-Btu gas to coal. The fuel, comprising a hydrogen-rich gas, is introduced at a fuel processor 12. A fuel processor 12 of a specific type is required for each class of fuel to be utilized. A fuel clean up unit 14 may be required to remove certain materials, such as sulfur, from the fuel prior to introduction to the fuel cell stack 10. With most fuels, both fuel and steam are introduced at the fuel processor 12 as indicated in FIG. 1. With some heavier fuels, an additional oxidant feed may be required together with the fuel and steam.

The cell stack 10 will be seen to generally comprise an anode plate or end 16, a cathode plate or end 18 and an electrolyte 20 therebetween. As will be seen later, this is a simplified representation, as many similar fuel cells, each comprising an anode, a cathode and electrolyte therebetween are stacked in series to form the fuel cell stack 10. The fuel enters the fuel cell stack 10 at the anode end 16, and an oxidant comprising an oxygen-rich gas such as air is introduced to the cathode end 18. This air is introduced by a blower 21.

The alkali metal carbonates and compounds that they form during fuel cell operation have a vapor pressure on the order of one part per million in the gas phase. Accordingly, carbonate vapor scrubbers 22 may be placed in the reactant exhaust streams from both the anode 16 and the cathode 18 to capture these vapors in a controlled manner to avoid fouling of downstream plumbing or controls.

The fuel cell cannot consume all of the hydrogen in the fuel gas. Accordingly, hydrogen, as well as carbon monoxide remaining in an exhaust vent 26 from the anode is often burned to extract remaining energy therefrom. Carbon dioxide vented from the anode at an exhaust vent 26 may be utilized as a cathode reactant. Generally, this is done by oxidizing the remaining fuel in the anode vent stream at a combustor 28 following the carbonate vapor scrubber, and the resulting exhaust is fed into the cathode air supply stream as indicated at reference numeral 30. Excess heat may be removed from the fuel cell stack 10 by a as recycle loop on the cathode 18. This recycle loop includes the previously mentioned carbonate vapor scrubber 22, as well as a heat exchanger 32 and a recycle blower 34.

Figure 2:
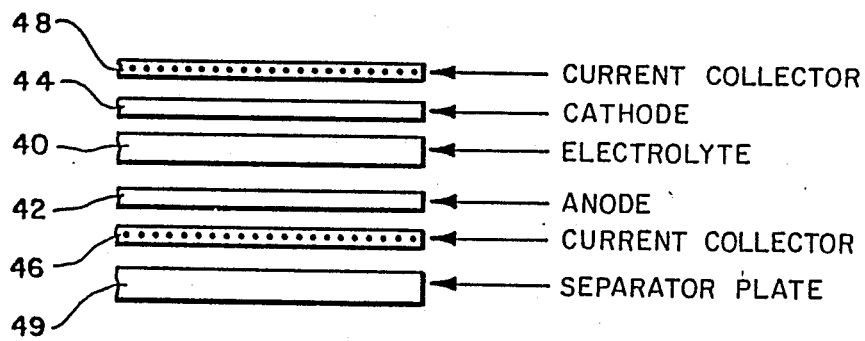
FIG. 2 is a schematic representation of a fuel cell.

As previously mentioned, the fuel cell stack 10 includes a plurality of individual fuel cells. Each of these fuel cells is configured generally as illustrated in FIG. 2, to which reference is now invited. Each fuel cell contains an electrolyte 40 between respective anode and cathode members 42 and 44. The electrolyte is preferably a mixture of lithium and potassium carbonates contained in a lithium aluminate particulate matrix. At room temperature, this mixture is a solid and resembles a ceramic tile, and hence the electrolyte is often referred to as the "tile". However, at normal cell operating temperatures of on the order 1200 degrees F. (650 degrees C.) the carbonates are molten and serve as good ionic conductors. The anode and cathode structures are preferably porous metal structures. Hence, in operation, the nickel at the cathode oxidizes. The nickel and nickel oxides present in the cell are sufficiently active at the cell temperatures just mentioned to act as catalysts for both the anode and cathode reactions.

The anode 42 and cathode 44 are each provided with a current collector structure 46, 48, these current collectors being often referred to as the fuel field current collector (46) and the air field current collector (48), respectively. A separator plate structure 49 is utilized to separate each fuel cell in the stack from the adjacent similar fuel cell to either side thereof. Preferably, the separator plates 49 comprise a dual-layered nickel and stainless steel structure, with the nickel side facing the anode side of one fuel cell and the stainless steel side facing the cathode end of the adjacent fuel cell in the stack.

Figure 3:
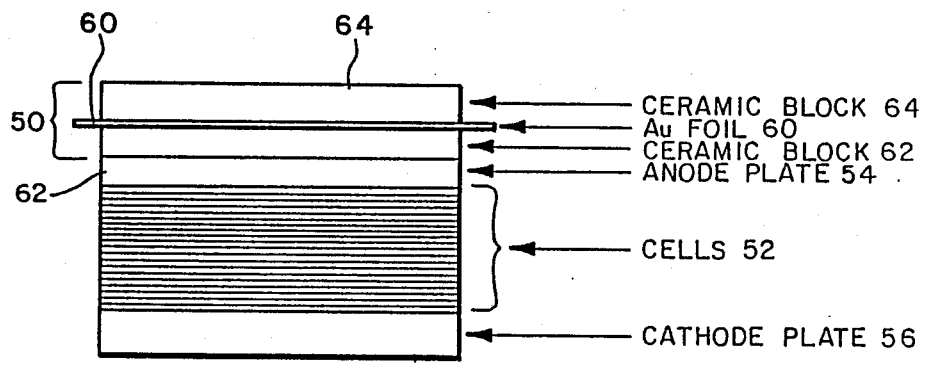
FIG. 3 is a diagrammatic representation of a fuel cell stack including a creepage barrier in accordance with the invention.
Figure 5:
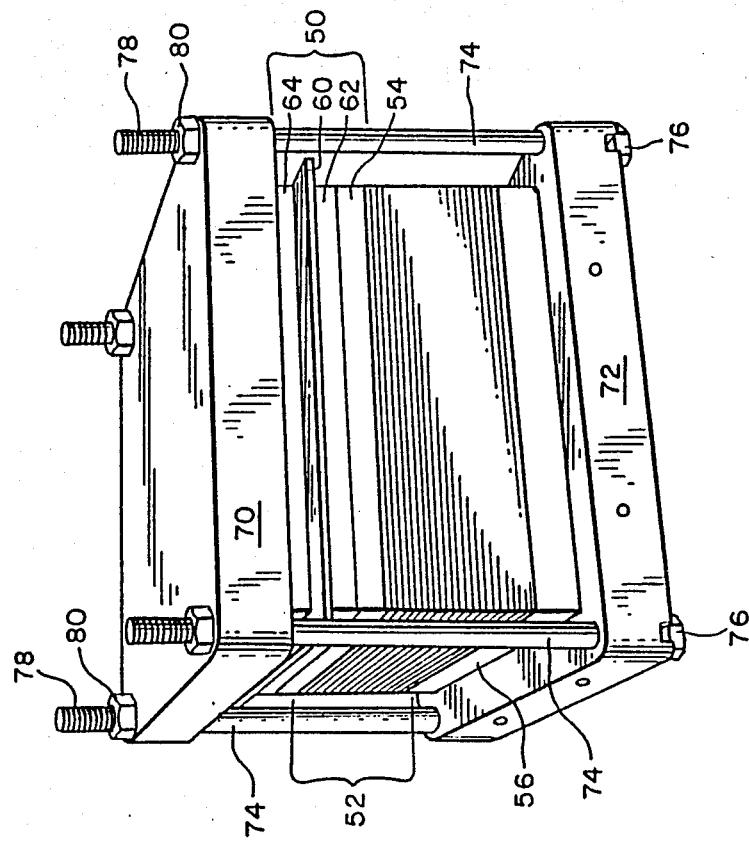
FIG. 5 is a perspective view of an assembled fuel cell stack including a creepage barrier in accordance with the invention.
Figure 4:
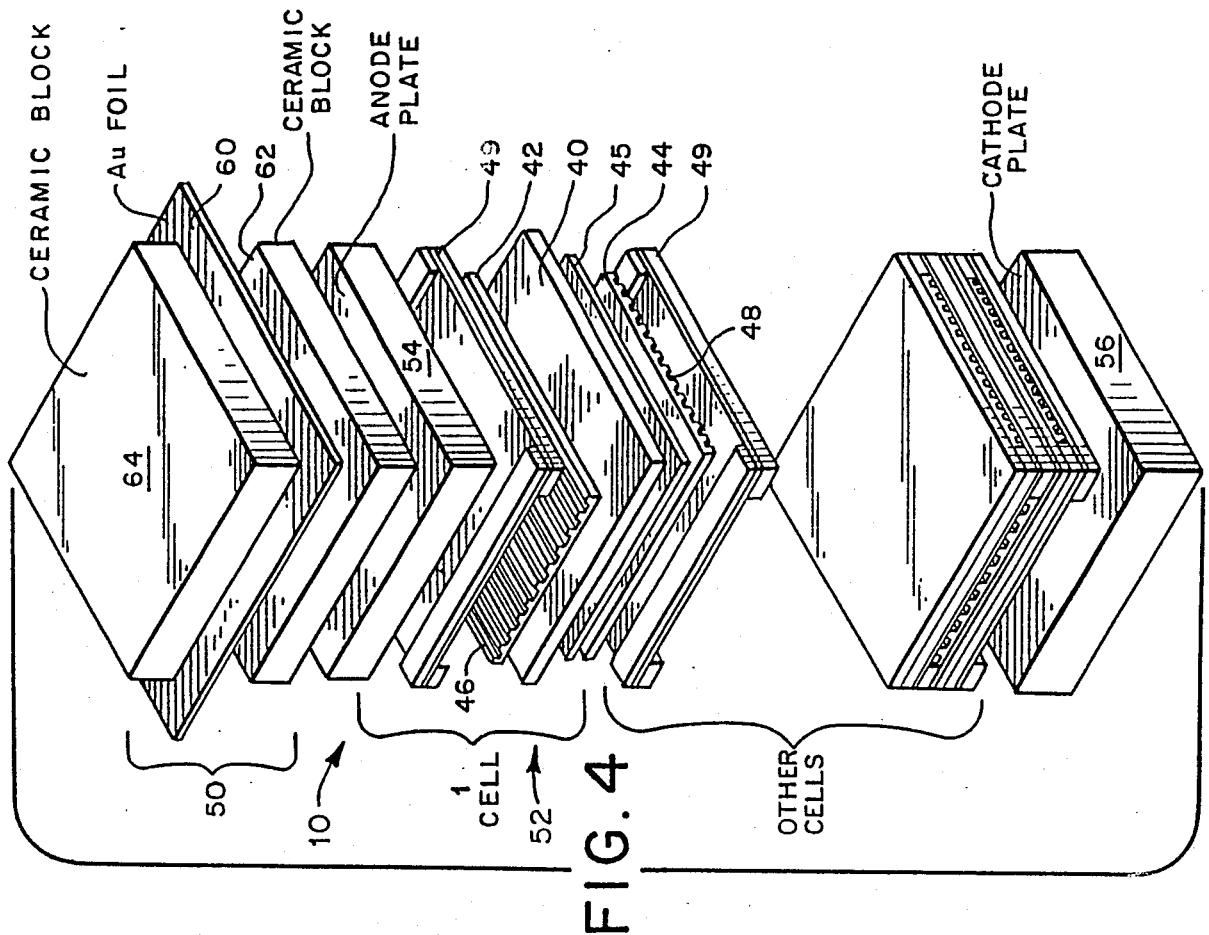
FIG. 4 is an exploded perspective view of a fuel cell stack including a creepage barrier in accordance with the invention.

Referring now to FIGS. 3, 4 and 5, the structure of a fuel cell stack in accordance with the invention is illustrated. In this regard, it will be recalled that it is an important object of the invention to prevent loss of electrolyte due to creepage of liquid electrolyte films along the surfaces and toward the negative end of a fuel cell or fuel cell stack. To this end, the invention provides a novel creepage barrier for substantially preventing electrolyte creepage at or from the negative end of a fuel cell or a fuel cell stack. In the diagrammatic illustration of FIG. 3, the creepage barrier is designated generally by reference numeral 50. While the invention is described herein with reference to a fuel cell stack comprising a plurality of fuel cells, the principles of the invention are equally applicable to a fuel cell electrical power generation apparatus having but a single fuel cell.

Referring first to the other components of the fuel cell stack, it will be noted that a plurality of cells, each having the structure described above with reference to FIG. 2, are stacked or sandwiched together as designated generally at reference numeral 52. At either end of the fuel cell stack, an enlarged, rectilinear plate-like or block-like collector plate 54, 56, is utilized. Both negative end or anode plate or collector 54 and the positive end or cathode plate or collector 56 are preferably composed of stainless steel. Each cathode 44, as best viewed in FIG. 4 preferably additionally is provided with a cathode catalyst layer 45. The current collectors 46 and 48 will be seen to comprise outwardly facing surfaces of the anodes and cathodes respectively.

In accordance with the invention, the creepage barrier 50 comprises a relatively thin layer 60 of a predetermined, selected material which is poorly wet by the molten carbonate electrolyte. The term "wetting" will be understood to refer generally to the tendency of a given material to cause a liquid to spread over a surface in a film or sheet, and hence to "wet" the surface. In this regard, a material which tends to resist the information of a fluid film or sheet may be referred to as an essentially non-wettable or poorly wet material. Stated alternatively, the material may be said to be one that is wet only with difficulty, tending to resist fluid filming of a given liquid material. This thin layer is disposed in such a way as to substantially prevent electrolyte creepage from the negative end of the fuel cell stack. At least one such thin layer of predetermined material is disposed in a predetermined position intermediate an outermost anode end of the fuel cell and a facing (i.e., facing in the direction of the anode) outermost end of the electrolyte matrix. The following description particularly illustrates one such disposition of the thin layer in accordance with a preferred form of the invention. However, alternative or additional such placements of such thin layers of poorly wet material may be utilized without departing from the invention.

In the illustrated embodiment, the electrolyte creepage barrier also includes a pair of similar ceramic members 62, 64, one disposed to either side of the thin layer of material 60. Preferably, the thin layer of material 60 comprises either a gold or a gold-palladium foil. While these materials are the presently preferred materials, other materials which exhibit similar properties may be used without departing from the invention. These properties include the ability to withstand intact the temperature of the molten liquid electrolyte and absence of any reactants, contaminants or other properties which would tend to disturb the electrochemical process, as well as being poorly wet by the liquid electrolyte as described above.

The ceramic members 62 and 64 preferably comprise generally rectilinear ceramic blocks which are placed in alignment with the anode plate 54. In this regard, the surface areas or length and width dimensions of the blocks 62 and 64 are preferably substantially similar to the length and width dimensions or facing surface area of the anode plate 54. Moreover, the blocks 62 and 64 are disposed substantially in alignment and preferably congruently with one another and with the facing surface of the anode plate 54. The thin layer or foil 60 is then sandwiched between the ceramic blocks 62 and 64. However, it will be seen that the thin layer or foil 60 is of substantially greater length and width dimensions or surface area than the respective ceramic blocks 62 and 64. Accordingly, the foil or thin layer 60 extends laterally outwardly of the blocks about the periphery thereof.

In FIG. 5, the fuel cell stack of FIG. 4, including the novel creepage barrier of the invention is shown in assembled condition, with additional structural elements utilized for holding the stack and creepage barrier together in assembled condition. This additional structure preferably comprises substantially similar top and bottom rectilinear housing plates or blocks 70, 72. These rectilinear plates or blocks 70 and 72 are preferably of greater surface area or length and width dimensions than the cell stack 52 and may be of similar such surface area to the foil 60. Accordingly, the plates 70 and 72 are joined by four substantially similar elongate joining or coupling rods 74 at the respective corners thereof. These coupling rods 74 preferably have enlarged diameter heads 76 at one end thereof for abutting the outwardly facing surface of the plate 72 and are externally threaded, as indicated at 78, at opposite ends thereof for receiving mating fasteners or nuts 80 for abutting the outwardly facing surface of plate 70.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the spirit and scope of the invention.

The invention is claimed as follows:

1. A method for blocking creepage of molten carbonate stack including a plurality of similar fuel cells stacked one on top of another and a generally rectilinear anode plate disposed at an anode end of said fuel cell stack, said method comprising: placing a relatively thin layer of a predetermined material which is poorly wet by said electrolyte adjacent an outer surface of said anode plate, said thin layer of material having length and width dimensions greater than those of said anode plate and being placed in such a manner as to extend beyond the periphery of said anode plate to substantially prevent electrolyte creepage at the anode end of the fuel cell.

2. A method according to claim 1 wherein said predetermined material comprises a gold foil.

3. A method according to claim 1 wherein said predetermined material comprises a gold-palladium foil.

4. A method according to claim 1 and further placing a pair of similar ceramic members adjacent said anode plate of said fuel cell and disposing said relatively thin layer of predetermined material between said ceramic members.

5. A method according to claim 4 and further including providing said ceramic members as generally rectilinear blocks of ceramic material and disposing said blocks in alignment with said anode plate at said negative end of said fuel cell stack.

6. A method according to claim 5 and further including providing said relatively thin layer of predetermined material of substantially greater cross-sectional dimension than the dimensions of said ceramic block so as to extend laterally outwardly of said blocks about the periphery thereof.

7. A method according to claim 6 wherein said predetermined material comprises a gold foil.

8. A method according to claim 6 wherein said predetermined material comprises a gold-palladium foil.

9. A method for blocking creepage of molten carbonate electrolyte in a fuel cell comprising: disposing a creepage barrier in such a way as to substantially prevent electrolyte creepage at a negative end of said fuel cell; wherein disposing of said creepage barrier includes placing a relatively thin layer of a predetermined material which is poorly wet by the electrolyte adjacent a negative end of said fuel cell, and further including placing a pair of similar ceramic members adjacent said negative end of said fuel cell and disposing said relatively thin layer of predetermined material between said ceramic members.

* * * * *

UNITED STATES PATENT AND TRADEMARK OFFICE
CERTIFICATE OF CORRECTION

PATENT NO. : 4,835,073
DATED : May 30, 1989
INVENTOR(S) : H. Russell Kunz

It is certified that error appears in the above-identified patent and that said Letters Patent is hereby corrected as shown below:

Column 3, Line 52 " 10 by a as recycle" it should be

-- 10 by a gas recycle --

Column 6, Line 12 " molten carbonate stack including " it should be -- molten carbonate in a fuel cell, wherein said fuel cell comprises a fuel cell stack including --

Column 6, Line 29 " further placing " it should be

-- further including placing --

Signed and Sealed this

Seventh Day of August, 1990

Attest:

HARRY F. MANBECK, JR.

*Attesting Officer*     *Commissioner of Patents and Trademarks*